(12) United States Patent
Turpin

(10) Patent No.: US 7,720,226 B2
(45) Date of Patent: May 18, 2010

(54) PRIVATE AND SECURE OPTICAL COMMUNICATION SYSTEM USING AN OPTICAL TAPPED DELAY LINE

(75) Inventor: Terry M. Turpin, Columbia, MD (US)

(73) Assignee: Essex Corporation, Columbia, MD (US)

( * ) Notice: Subject to any disclaimer, the term of this patent is extended or adjusted under 35 U.S.C. 154(b) by 1127 days.

(21) Appl. No.: 10/715,824

(22) Filed: Nov. 19, 2003

(65) Prior Publication Data

US 2004/0264695 A1   Dec. 30, 2004

Related U.S. Application Data

(60) Provisional application No. 60/427,249, filed on Nov. 19, 2002.

(51) Int. Cl.
*H04K 1/00* (2006.01)
*G02B 5/136* (2006.01)

(52) U.S. Cl. .................... 380/256; 380/219; 380/220; 359/577

(58) Field of Classification Search .............. 380/256, 380/219, 220, 28; 359/331, 577, 263, 325, 359/333; 385/18
See application file for complete search history.

(56) References Cited

U.S. PATENT DOCUMENTS

| | | | |
|---|---|---|---|
| 4,359,736 A * | 11/1982 | Lewis | 342/16 |
| 4,448,529 A * | 5/1984 | Krause | 356/310 |
| 4,474,424 A | 10/1984 | Wagner | |
| 4,577,933 A * | 3/1986 | Yip et al. | 359/216 |
| 4,588,255 A | 5/1986 | Tur et al. | |
| 4,588,260 A | 5/1986 | Horner | |
| 4,723,829 A | 2/1988 | Koonen | |
| 4,765,714 A * | 8/1988 | Horner et al. | 359/561 |
| 4,769,537 A * | 9/1988 | Taillebois et al. | 250/226 |
| 4,779,266 A | 10/1988 | Chung et al. | |
| 4,866,699 A | 9/1989 | Brackett et al. | |
| 4,871,232 A | 10/1989 | Grinberg et al. | |
| 4,926,412 A | 5/1990 | Jannson et al. | |
| 4,933,990 A | 6/1990 | Mochizuki et al. | |
| 5,024,508 A | 6/1991 | Horner | |

(Continued)

FOREIGN PATENT DOCUMENTS

EP      0090771 A1    10/1983

(Continued)

OTHER PUBLICATIONS

Jaejin Lee, Chungyong Lee, and Douglas B. Williams, "Secure Communication Using Chaos," 1995 IEEE, pp. 1183-1187.

(Continued)

*Primary Examiner*—Eleni A Shiferaw
(74) *Attorney, Agent, or Firm*—Tarolli, Sundheim, Covell, Tummino LLP

(57) ABSTRACT

A method and apparatus for secure transmission of an information-containing optical signal. An optical signal is divided into a first plurality of sub-bands. Each of the sub-bands is modified to encrypt the information contained in the optical signal. The modified sub-bands are combined into a combined optical signal. The combined optical signal is divided into a second plurality of sub-bands. Each of the second plurality of sub-bands is modified to decrypt the previously encrypted information contained in the optical signal.

15 Claims, 4 Drawing Sheets

U.S. PATENT DOCUMENTS

| | | | |
|---|---|---|---|
| 5,172,258 A | 12/1992 | Verber | |
| 5,191,614 A | 3/1993 | LeCong | |
| 5,274,488 A | 12/1993 | Udd | |
| 5,311,360 A * | 5/1994 | Bloom et al. | 359/572 |
| 5,351,324 A | 9/1994 | Forman | |
| 5,377,182 A * | 12/1994 | Monacos | 370/219 |
| 5,390,046 A * | 2/1995 | Gesell et al. | 359/287 |
| 5,394,489 A | 2/1995 | Koch | |
| 5,408,319 A | 4/1995 | Halbout et al. | |
| 5,473,696 A | 12/1995 | Van Breemen et al. | |
| 5,479,026 A | 12/1995 | Schumtz et al. | |
| 5,541,756 A | 7/1996 | Chang-Hasnain et al. | |
| 5,546,209 A | 8/1996 | Willner et al. | |
| 5,677,762 A * | 10/1997 | Ortyn et al. | 356/39 |
| 5,680,104 A * | 10/1997 | Slemon et al. | 340/568.2 |
| 5,786,915 A | 7/1998 | Scobey | |
| 5,793,871 A * | 8/1998 | Jackson | 380/54 |
| 5,835,517 A | 11/1998 | Jayaraman et al. | |
| 5,852,505 A | 12/1998 | Li | |
| 5,864,625 A | 1/1999 | Rutledge | |
| 5,881,079 A | 3/1999 | Doerr et al. | |
| 5,903,648 A | 5/1999 | Javidi | |
| 5,930,045 A | 7/1999 | Shirasaki | |
| 5,946,331 A | 8/1999 | Amersfoort et al. | |
| 5,969,865 A | 10/1999 | Shirasaki | |
| 5,969,866 A | 10/1999 | Shirasaki | |
| 5,973,838 A | 10/1999 | Shirasaki | |
| 5,991,079 A * | 11/1999 | Furlani et al. | 359/573 |
| 5,999,320 A | 12/1999 | Shirasaki | |
| 6,002,773 A | 12/1999 | Javidi | |
| 6,018,582 A | 1/2000 | Francois et al. | |
| 6,028,706 A | 2/2000 | Shirasaki et al. | |
| 6,046,715 A * | 4/2000 | Towler et al. | 345/95 |
| 6,046,854 A | 4/2000 | Bhagavatula | |
| 6,114,994 A * | 9/2000 | Soref et al. | 342/372 |
| 6,130,971 A | 10/2000 | Cao | |
| 6,144,494 A | 11/2000 | Shirasaki et al. | |
| 6,160,651 A | 12/2000 | Chang et al. | |
| 6,169,630 B1 | 1/2001 | Shirasaki et al. | |
| 6,185,040 B1 | 2/2001 | Shirasaki et al. | |
| 6,219,161 B1 | 4/2001 | Chang et al. | |
| 6,233,075 B1 | 5/2001 | Chang et al. | |
| 6,271,946 B1 | 8/2001 | Chang et al. | |
| 6,380,547 B1 * | 4/2002 | Gonzalez et al. | 250/458.1 |
| 6,411,417 B1 | 6/2002 | Roberts et al. | |
| 6,519,340 B1 | 2/2003 | Javidi | |
| 6,608,721 B1 | 8/2003 | Turpin et al. | |
| 6,810,165 B2 * | 10/2004 | Golub et al. | 385/18 |
| 6,858,864 B2 * | 2/2005 | Atanackovic et al. | 257/17 |
| 7,146,109 B2 * | 12/2006 | Chen et al. | 398/183 |
| 7,158,185 B2 * | 1/2007 | Gastaldi | 348/435.1 |
| 7,184,553 B2 * | 2/2007 | Mahlab et al. | 380/256 |
| 2001/0028758 A1 * | 10/2001 | Abbott et al. | 385/24 |
| 2003/0128845 A1 * | 7/2003 | Kudumakis | 380/210 |
| 2003/0147533 A1 * | 8/2003 | Mahlab et al. | 380/256 |
| 2006/0291859 A1 * | 12/2006 | Young et al. | 398/58 |

FOREIGN PATENT DOCUMENTS

| | | |
|---|---|---|
| EP | 0 881 527 | 12/1998 |
| EP | 1 001 287 | 5/2000 |
| JP | 10-256663 | 9/1998 |
| JP | 11-095061 | 4/1999 |
| JP | 11-101923 | 4/1999 |
| JP | 11-119173 | 4/1999 |
| JP | 11-171608 | 6/1999 |
| JP | 11-174268 | 7/1999 |
| JP | 11-202151 | 7/1999 |
| JP | 11-223745 | 8/1999 |
| JP | 11-258413 | 9/1999 |
| JP | 11-511568 | 10/1999 |
| JP | 11-326687 | 11/1999 |
| JP | 11-513138 | 11/1999 |
| JP | 11-352356 | 12/1999 |
| JP | 2000-028849 | 1/2000 |
| JP | 2000-075165 | 3/2000 |
| JP | 2000-111831 | 4/2000 |
| JP | 2000-147280 | 5/2000 |
| JP | 2000-147305 | 5/2000 |
| JP | 2000-171649 | 6/2000 |
| WO | WO99/39464 | 5/1999 |
| WO | WO-99/39411 | 8/1999 |
| WO | WO-00/22741 | 4/2000 |
| WO | WO03/023980 A2 | 10/2002 |
| WO | WO-03/023980 | 3/2003 |

OTHER PUBLICATIONS

Daniel F. Drake and Douglas B. Williams, "Pseudo-chaos for direct-sequence spread-spectrum communication," 1976 SPIE vol. 2612, pp. 104-114.

Charles H. Bennett, "Experimental Quantum Cryptography[1]," 1992 Journal of Cyrptology, pp. 3-28.

Graeme, M. et al., (Feb. 1993) "Monolithic 16-channel Fourier-optic-based WDM in Planar Silica" *Components for Fiber Optic Applications VII. Proc. SPIE*.1792 (Abstract only).

Jacob, J.B. et al., (1999)."Very High Bit Rate Optical Switch for ATM Application" *Commutation & Transmission.* 16(2)(Abstract only).

Davis, J. A., et al., (Jan. 1995) "Phase Analysis of Diffracted Beams Using Multiplexed Fourier Transform Lenses" Optical Engineering vol. 34(01) (Abstract only).

Shirasaki, M. (Mar. 1, 1996)."Large angular dispersion by a virtually imaged phased array and its application to a wavelength demultiplexer", *Optics Letters, Optical Society of America.* 21(5):366-368.

Jan, Y. et al., (Dec. 1997), "Widely Tunable Integrated Filter/Receiver with Apodized Grating-Assisted Codirectional Coupler." *Optoelectronic Integrated Circuits II, Proc. SPIE.* 3290 (Abstract only).

Yang, M. et al., (Mar. 20, 1999)."Flattopped Tunable Wavelength-Division-Multiplexer Filter Design" *Optical Society of America* (Abstract only).

Shirasaki, M. (Jul. 1999). "Virtually Imaged Phased Array" *Fujitsu Sci. Techn. J.*, 35(1):113-125.

Shirasaki, M. et al., (Nov. 1999)."Virtually Imaged Phased Array with Graded Reflectivity", *IEEE Photonics Technology Letters.* 11(11):1443-1445.

Turpin, T. et al., U.S. Office Action mailed Sep. 11, 2002, directed to a related U.S. Appl. No. 09/687,029; 7 pages.

Turpin, T et al., U.S. Office Action mailed Jan. 14, 2003, directed to a related U.S. Appl. No. 09/687,029; 7 pages.

International Search Report and Written Opinion mailed Aug. 26, 2002, directed to counterpart International Patent Application No. PCT/US01/17783; 9 pages.

International Preliminary Examination Report mailed Oct. 22, 2002, directed to counterpart International Patent Application No. PCT/US01/17783; 3 pages.

Canadian Office Action dated Sep. 27, 2007, directed to counterpart Canadian Patent Application No. 2,414,027; 2 pages.

Canadian Office Action dated May 7, 2008, directed to counterpart Canadian Patent Application No. 2,414,027; 2 pages.

EP Office Action dated Nov. 25, 2003, directed to counterpart EP Patent Application No. 01 984 116.2; 3 pages.

EP Office Action dated Jan. 13, 2005, directed to counterpart EP Patent Application No. 01 984 116.2; 4 pages.

EP Office Action dated Jul. 14, 2006, directed to counterpart EP Patent Application No. 01 984 116.2; 5 pages.

* cited by examiner

PRIVATE AND SECURE OPTICAL COMMUNICATION SYSTEM USING AN OPTICAL TAPPED DELAY LINE

FIELD OF THE INVENTION

The present invention relates generally to optical systems, including what may be referred to as optical communications systems, optical telecommunications systems and optical networks, and more particularly to a method and system for information security in an optical transmission system.

BACKGROUND OF THE INVENTION

Optical telecommunications is a primary method of transporting information around the world. Wavelength Division Multiplexing (WDM) technology has led to as many as 80 and 160 information-carrying wavelengths on a single fiber at bit rates as high as 10 and 40 gigabits per second per wavelength. While this increase in throughput and capacity is impressive, security is becoming increasingly important as the use of fiber optic WDM and free space optical telecommunication systems continue to expand.

Most existing methods of protecting an optical transmission encrypt a signal in the electrical domain before the signal is transferred to the optical layer. For example, in van Breeman et al, U.S. Pat. No. 5,473,696, the data stream is enciphered by adding, modulo 2, a pseudorandom stream before transmission and recovering the data by addition of the same pseudorandom stream. Rutledge, U.S. Pat. No. 5,864,625, electronically encrypts the information and optically transmits a security key used for the encryption process. These types of protection systems are limited by the electronic processing rate, currently, no better than approximately 2.5 to 10 gigabits per second. Secondly, these electronic methods of protection are costly to implement and can create latency issues.

Brackett et al in U.S. Pat. No. 4,866,699 teaches an analog method of coding and decoding for multi-user communications based on optical frequency domain coding and decoding of coherently related spectral components. Brackett fails to address any secure or privacy communication applications where the spectral components are not coherently related.

In view of the foregoing, one object in accordance with the present invention is to improve optical communications security by providing an analog method of protecting transmissions that is lower in cost, volume, weight and/or power, especially at high transmission bit rates.

SUMMARY OF THE INVENTION

The present invention, in a preferred embodiment, provides an analog method and apparatus for effectively protecting electronic communications that may be transmitted, for example, over a fiber optic or free-space network. In a preferred embodiment the present invention may use a combination of an Optical Tapped Delay Line (OTDL), as disclosed in U.S. Pat. No. 6,608,721 (which patent is incorporated herein by reference), with known methods of altering the properties of an analog signal.

A privacy system can be described as a system where the source signal is sufficiently protected to make unauthorized interception exceptionally difficult for the majority of potential adversaries, but not so difficult as to prevent interception by a sophisticated, well-funded and determined adversary, such as a government. A secure system is one in which the transmitted information signal is well protected against unauthorized intrusion by highly sophisticated adversaries having extensive computing resources. The security provided in accordance with the present invention can attain many levels of security, from a privacy system to a truly secure system, by, for example: (1) varying the number of sub-bands; (2) changing the analog properties of the sub-bands by altering the phase, introducing time delays, or shifting the originating signal's frequency components; and (3) controlling the periodicity of the changes.

The rate of signal transmission also affects the probability of signal interception. For example, a 10 gigabit per second signal is inherently more difficult to intercept than a 2.5 gigabit per second signal. The present invention, in a preferred embodiment, is capable of protecting optical signals at bit rates exceeding 1 gigabit per second.

A transmission using a preferred embodiment of the present invention is protected from an attack because any attack requires coherent detection of a large bandwidth of analog data at a high-precision digitization rate, and even if coherently intercepted, the properties of the signal are scrambled to the extent that recovery is virtually impossible. For example, an OTDL device with 128 sub-bands and 10 different phase shift combinations, requires a brute-force attack approaching $10^{128}$ tries to coherently recover the signal, a feat not possible with current analog-to-digital conversion technology combined with the fastest supercomputer. To make interception even less likely, the sub-band distortion pattern can be periodically changed.

DETAILED DESCRIPTION

Figure 1:
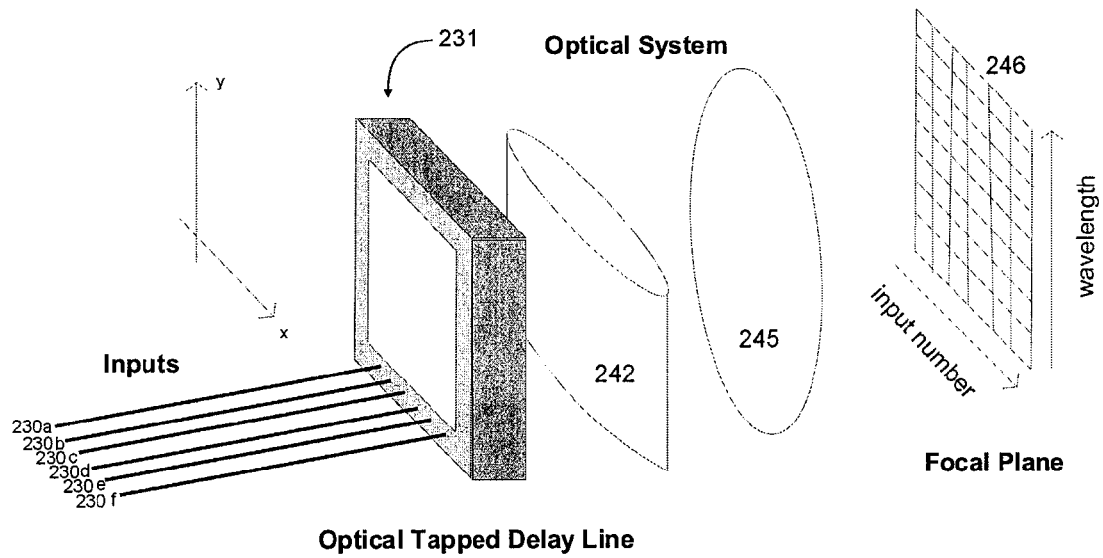
FIG. 1 illustrates an example of an Optical Tapped Delay Line (OTDL).
Figure 2:
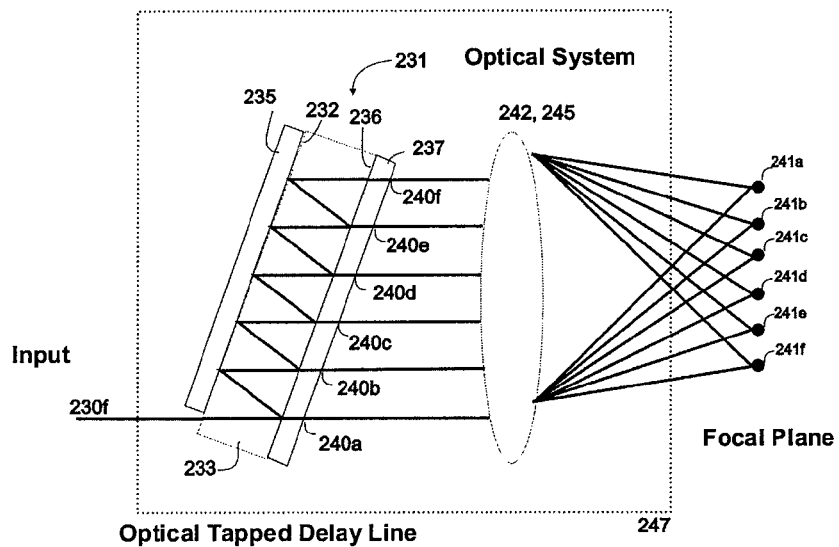
FIG. 2 illustrates an example of an operational side view of an OTDL device.

FIGS. 1 and 2 illustrate examples of the previously referenced OTDL device for demultiplexing a multi-channel WDM band into individual channels. A detailed explanation of the device is provided in U.S. Pat. No. 6,608,721 (incorporated herein by reference), but the operation will be briefly outlined here to facilitate understanding of some preferred embodiments of the invention. In the illustrated example, six collimated input beams 230a-230f enter an Optical Tapped Delay Line (OTDL) 231. The origin of the beams may be, for example, the collimated outputs of six optical fibers (not shown) where each fiber typically carries multiple wavelengths. A fully reflective coating 232 on plate 235 and a partially reflective coating 236 on plate 237 cause each of the input beams entering the device to be multiply reflected within a cavity 233. A portion of each beam, a beamlet, exits the cavity at a plurality of taps 240a-f, with each succeeding exiting portion being time delayed with respect to the preceding portion.

The various output beams are then directed to an anamorphic optical system having a cylinder lens 242 and a spherical lens 245. The anamorphic optical system 242, 245 performs the functions of: 1) Fourier transformation of the output of the cavity 231 in the vertical dimension y, and 2) imaging of the output beams of the OTDL 231 in the horizontal dimension x onto an output surface 246. The outputs are imaged on plane 246 with each information-carrying wavelength focused at a specific spot on the plane. By properly placing detectors at plane 246, each WDM information channel may be detected for further processing.

Figure 3:
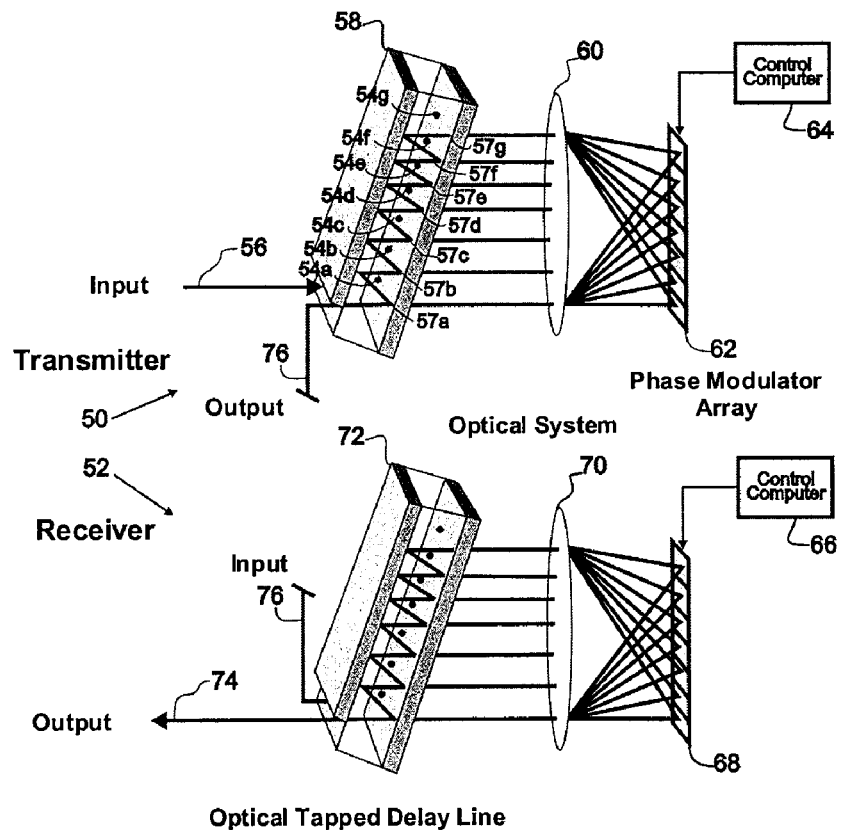
FIG. 3 illustrates an example of an operational side view of a preferred embodiment of the present invention operating in reflective mode.

FIG. 3 illustrates an example of an optical communications system in accordance with a preferred embodiment of the present invention. This embodiment includes a transmitter 50 and a receiver 52. A fiber 56 carrying an information-carrying optical signal is received by the OTDL 58. The light is processed as described in the explanation for FIGS. 1 and 2. The beamlets exit the OTDL from optical tap locations 54a to 54g and a lens system 60 interferes the beamlets onto a planar reflective phase modulator array 62. Passage through the OTDL 58 and lens 60 to the plane 62 has split the information-carrying optical signal into a number of sub-bands. The OTDL can be designed to output at least hundreds of sub-bands.

The reflective phase modulator array 62 may be implemented in a number of ways, including, but not limited to, a liquid crystal array, a MEMS device, or an array of III-V or II-VI semiconductor devices. The speed at which the phase shifting changes may directly affect the level of security afforded. In this example one modulator element is associated with each sub-band. As each sub-band passes through a modulator element, it is phase shifted in a manner determined by the control computer 64. The mirror part of the modulator array 62 reflects the sub-bands back through lens system 60 to tap locations 57a to 57g. The OTDL 58 recombines the taps into an optical signal for retransmission over a fiber optic carrier 76 to the destination.

The signal from transmitter 50 is received by OTDL 72 from fiber 76. The OTDL 72 and lens 70 combination is identical to the OTDL 58 and lens 60 combination. OTDL 72 and lens 70 separate the signal into the identical sub-bands created by OTDL 58 and lens 60. The sub-bands are imaged onto the reflective phase modulator array 68, with each array element receiving the same sub-band as the corresponding modulator in array 62. The control computer 66 causes each sub-band to be phase shifted in the opposite manner as instructed by control computer 64. Each sub-band is then reflected back through lens system 70 to OTDL 72 which together recombine the sub-bands into a single signal that is output to fiber 74 for further processing or routing.

The effect of imparting a phase shift to each sub-band is to introduce distortion. If the amount of distortion is sufficient, the information content becomes undecipherable and security is enhanced. The control computer 64 instructs the modulator array how to modify the phase of the sub-bands in a manner that is unpredictable to anyone not having knowledge of the computer input. The rate at which the phase shifts are changed depends upon the level of security required. A fixed phase shift pattern will sufficiently distort the signal to make it incomprehensible; however, determined interceptors can analyze the signal and eventually determine, and reverse the effects of, the phase shift pattern. To ensure continued security, the fixed phase shift pattern can be changed occasionally, requiring the potential interceptor to start the analysis over again. For the highest security, this change must be made often enough to guarantee that even with the highest performance computational systems anticipated, the phase shifts do not remain static long enough for any known analysis to succeed before the pattern changes. A secure system will result if the phase shifter array settings 62 and 68 in FIG. 3 are changed at least as fast as twice the time aperture required for an interceptor to compute the settings.

Preferably, the computer input to the phase modulators may be derived from a deterministic algorithm, the starting point of which may be derived from a key setting provided to the computer. This permits a receiver having knowledge of both the algorithm and the key setting to reproduce the same control computer signal, and thereby, reverse the phase distortions and recover the information signal intact.

For purposes of illustrating the principles of this embodiment of the invention, only a single signal or channel has been described. However, using the multi-port interleaving capability of the OTDL, as described in U.S. Pat. No. 6,608,721 (incorporated herein by reference), embodiments in accordance with the present invention are capable of simultaneously encrypting all channels of a multi-channel WDM communications system. As used herein the term "encrypting" includes all levels of security from low-security to the highest levels of certified security.

For the illustrated embodiment of the present invention to be optimally effective, the sub-band resolution, i.e., the spacing between each sub-band at focal plane 62 of the OTDL in FIG. 3, should be significantly finer, preferably at least 10 times finer, and more preferably at least 50 times finer, than the bandwidth of the input signal. In this particular embodiment, for example, if the input signal has a bit rate of 10 gigabits per second, the design of the OTDL should be at least 50 sub-bands with a spatial resolution at the focal plane of 200 MHz or finer.

Each array element may see a portion of the signal in the frequency domain, defined by the equation:

$$F(t, K) = \int_{\omega_K}^{\omega_{K+1}} \int_0^T f(S+t) e^{j\omega S} \, dS \, d\omega$$

where
i. t=aperture of the hyperfine device (tap key)
ii. S=time integration variable
iii. ω=frequency
iv. K=sub-band index
Defining $$\Psi(\omega, t) = \int_0^T f(S+t) e^{j\omega S} \, dS$$

as a sliding Fourier transform (e.g., block of data), Ψ(ω,t) may be perceived as that spectral component of the information signal incident on an element of the reflective phase shifter.

In a preferred embodiment, the present invention imparts a phase shift to each spectral component hitting a specific array element. Specifically, each array element sees a signal defined as a complex number $$Ae^{j\phi}$$

where φ is the entity to be altered by the phase shifter of the invention. In another embodiment, it would be possible to alter A (amplitude) instead of φ, but doing so would result in a loss of power and, potentially, information content. Altering φ does not produce a power loss, nor is any information content lost.

Figure 4:
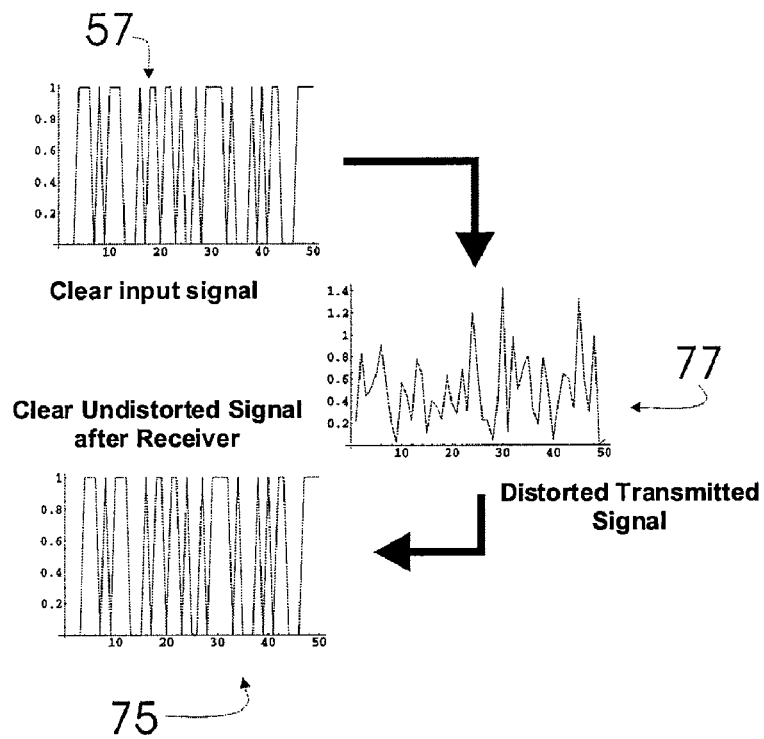
FIG. 4 illustrates an example of a signal before, during and after transmission through a preferred embodiment of the present invention.

FIG. 4 is a simulated example illustrating the transmission of the signal in FIG. 3. 57 is a representation of the original signal carried on fiber 56. After being phase shifted by transmitter 50, the transmitted and distorted signal appears as shown by 77. After passing through receiver 52, the signal is output on fiber 74 and appears as shown by 75, identical to the incoming original signal 57.

Figure 5:
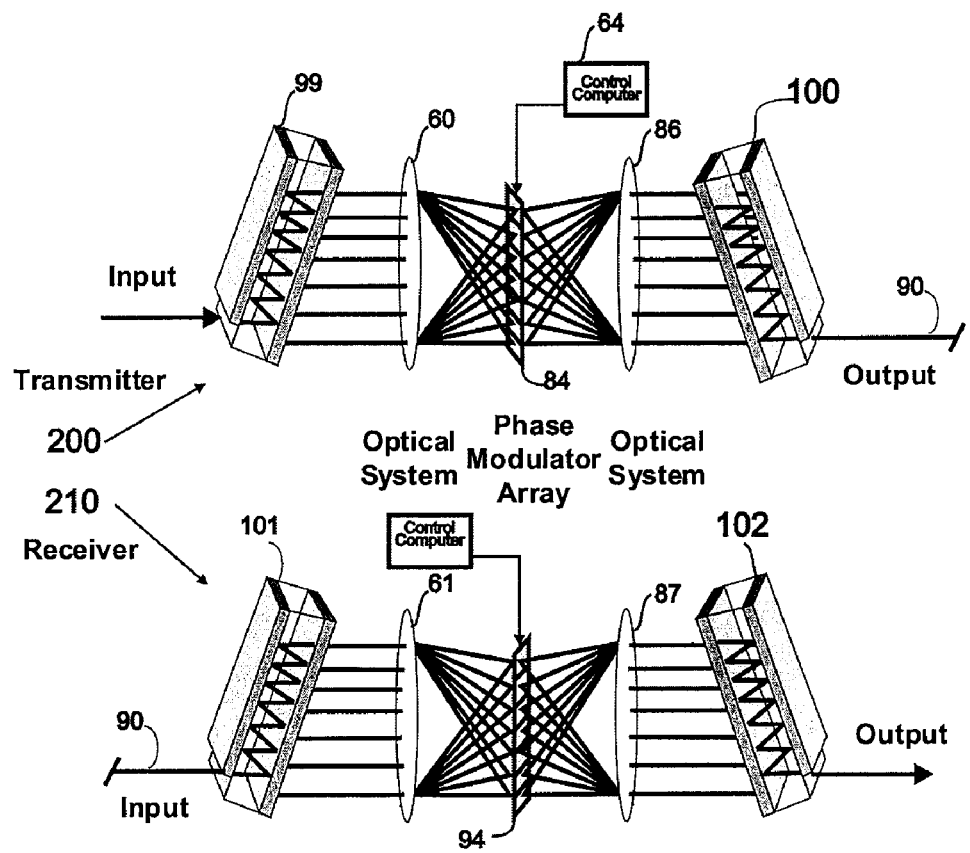
FIG. 5 illustrates an example of a preferred embodiment of the present invention in transmissive mode.

The embodiment illustrated in FIG. 3 is a reflective architecture of the present invention that utilizes the reversibility property of an OTDL, whereby, only one OTDL device is used for transmitting and receiving. An alternative embodiment of the present invention is a transmissive architecture illustrated in FIG. 5 where two OTDL devices comprise the transmitter 200 and two OTDL devices comprise the receiver 210. The phase shifter arrays 84 and 94 for this architecture are transmissive versus reflective. OTDL 100 combines the distorted signal into a signal for transmission on fiber 90. This signal is received by OTDL 101 from fiber 90 and, together with lens 60, separates the signal into the identical sub-bands created by OTDL 99 and lens 61. These sub-bands are passed through the transmissive phase shifter 94 and to lens 87 and OTDL 102 for recombining as the original undistorted signal.

As mentioned earlier, there are two other possible types of distortion techniques: (1) introduction of a random time delay; or (2) frequency shifting the sub-bands. A signal delay could be created by a coil, white cell, loop in a waveguide, or other types of free space delay. There are many methods to shift the frequency of an optical signal, such as using stimulated Brillouin Scattering, four wave mixing, three wave mixing, or use of any optical modulator device, such as a lithium niobate Mach-Zender, indium phosphide electroabsorption, electroabsorption multi-quantum well or an electrorefraction device. Note that the values of the frequency shifts applied must meet other constraints in order to be feasible for the embodiment used. Each of the three methods of signal distortion could be used independently or in any combination to produce a private or secure optical transmission system.

Figure 6:
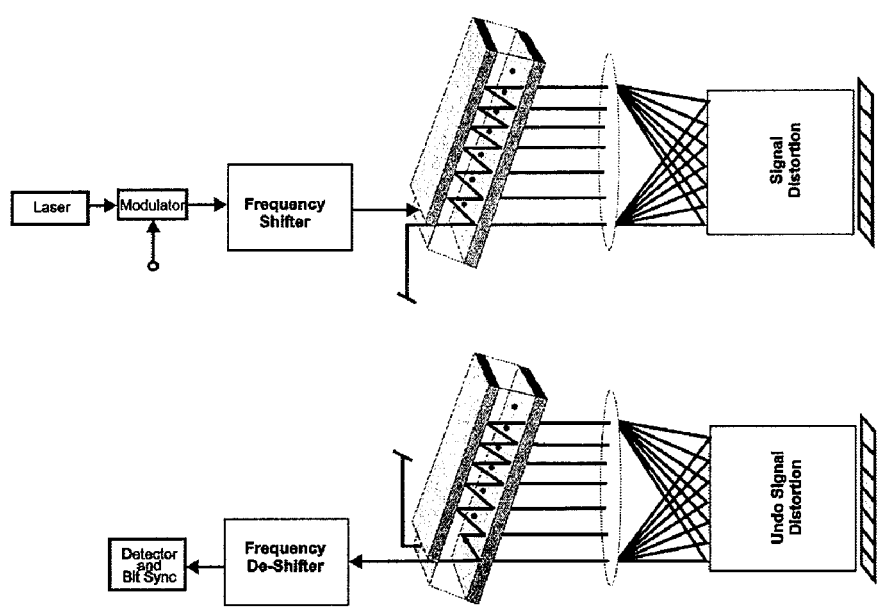
FIG. 6 illustrates an example of an input carrier frequency shifting embodiment of the present invention in reflective mode.
Figure 7:
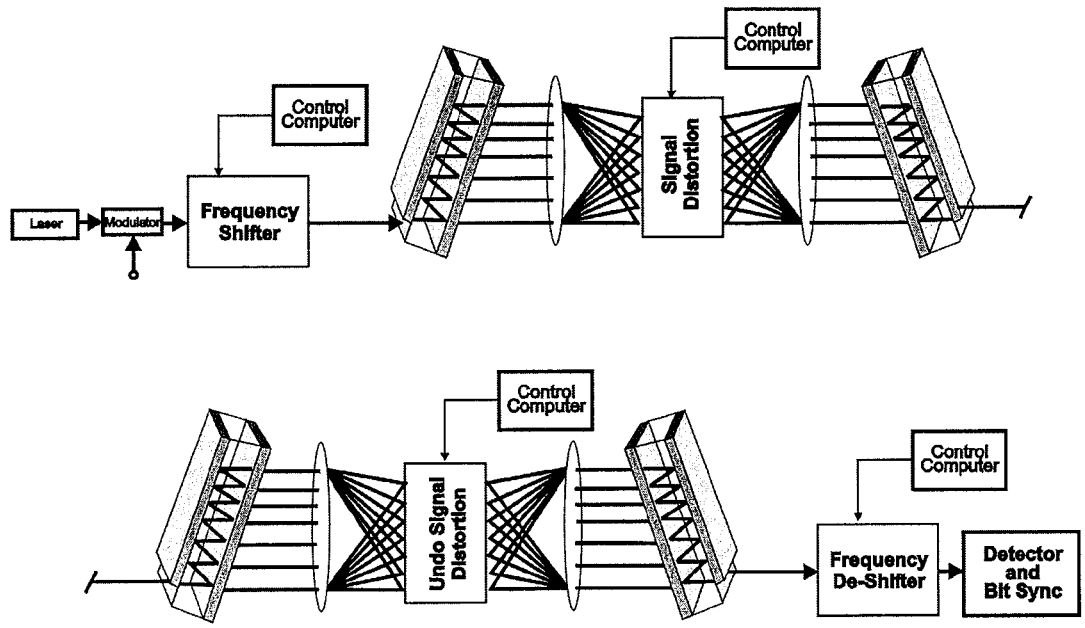
FIG. 7 illustrates an example of an input carrier frequency shifting embodiment of the present invention in transmissive mode.

Another preferred embodiment of the present invention involves destroying the coherence of the input carrier by shifting the frequency of the input source. Again, any of the previously mentioned in-line distortion techniques could be used in combination with this method. FIG. 6 shows an example of a reflective architecture in accordance with this method. FIG. 7 shows an example of a transmissive architecture in accordance with this method.

As illustrated in the example of FIG. 1, the OTDL may be a two-dimensional device, i.e., the OTDL may sub-channelize an optical signal from multiple fiber optic inputs shown as 230a through 230f producing a matrix of sub-bands and input fibers at the focal plane. Another method to obtain a higher level of security may be to use the previously described methods of distorting the sub-bands but also send the sub-bands out on differing outputs.

Figure 8:
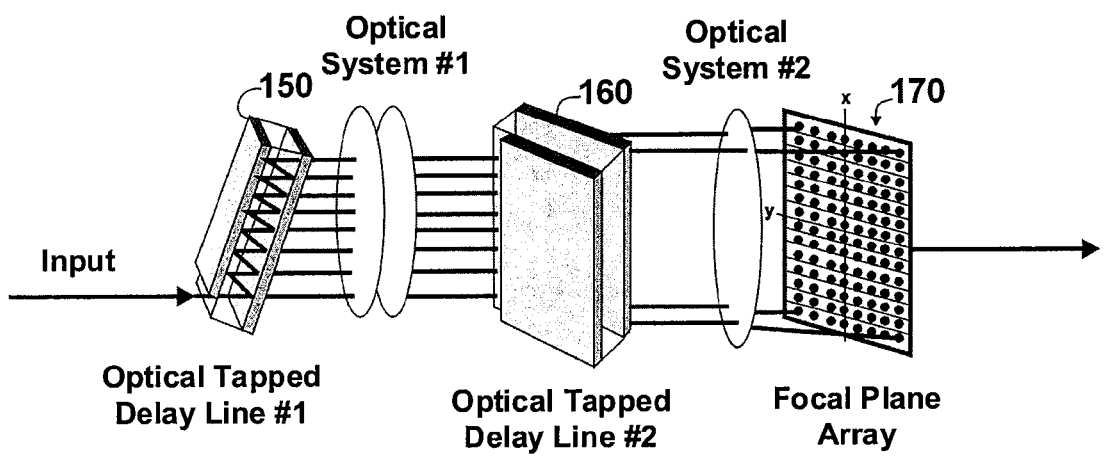
FIG. 8 illustrates an example of another embodiment of the present invention that uses two OTDL devices to obtain very high resolution sub-bands.

A further enhancement in security may be obtained using an OTDL in the architecture described in U.S. Pat. No. 6,608, 721 B1 (incorporated herein by reference) and shown in FIG. 8, where OTDL 160 is rotated 90 degrees from the orientation of a first OTDL 150. The first OTDL generates a coarse sub-banding. The second OTDL further subdivides each sub-band into finer sub-bands. This architecture creates a large number of very fine sub-bands of the incoming signal. The distortion methods previously discussed could be applied to each of the sub-bands at location 170. The very finely and distorted sub-bands could be recombined into a signal using the transmissive or reflective architecture disclosed previously for transmission to the destination. A receiver architecture using the design in FIG. 8 would separate the very fine sub-bands, reverse the distortion and recombine the undistorted sub-bands into a signal.

What is claimed is:

1. A method for secure transmission of an information-containing optical signal in a reflective/transmissive architecture, comprising:

dividing the optical signal using an optical tapped delay line into a first plurality of spectral sub-bands defined by the equation:

$$F(t, K) = \int_{\omega_K}^{\omega_{K+1}} \int_0^T f(S+t) e^{j\omega S} \, dS \, d\omega$$

where
  i. t=aperture of the hyperfine device (tap key),
  ii. S=time integration variable,
  iii. ω=frequency, and
  iv. K=sub-band index, modifying each of the first plurality of spectral sub-bands to encrypt the information contained in the optical signal by at least one of (i) imparting a phase shift to each sub-band, (ii) imparting a time delay to each sub-band, and (iii) imparting a frequency shift to each sub-band, combining the modified first plurality of spectral sub-bands into a combined optical signal, dividing the combined optical signal into a second plurality of spectral sub-bands, modifying each of the second plurality of spectral sub-bands to decrypt the previously encrypted information contained in the optical signal by at least one of (i) imparting a phase shift to each sub-band, (ii) imparting a time delay to each sub-band, and (iii) imparting a frequency shift to each sub-band.

2. The method of claim 1 wherein the information-containing optical signal has a bandwidth and at least one of the first and second plurality of spectral sub-bands has a sub-band resolution at least 50 times finer than the bandwidth of the information-containing optical signal.

3. The method of claim 1 wherein the information-containing optical signal is transmitted at a bit rate of not less than 1 gigabit per second.

4. The method of claim 1 wherein the information-containing optical signal is transmitted at a bit rate of not less than 10 gigabits per second, wherein at least the first plurality of spectral sub-bands comprise not less than 50 spectral sub-bands and wherein at least the first plurality of spectral sub-bands has a spatial resolution at a focal plane of not greater than 200 MHz.

5. The method of claim 1 wherein the first plurality of spectral sub-bands comprise not less than 100 spectral sub-bands.

6. The method of claim 1 wherein at least one of the steps of modifying each of the first plurality of spectral sub-bands and modifying each of the second plurality of spectral sub-bands comprises at least one of imparting a phase shift to each sub-band, imparting a time delay to each sub-band, and imparting a frequency shift to each sub-band.

7. The method of claim 6 comprising at least one of imparting a phase shift to each sub-band, imparting a time delay to each sub-band, and imparting a frequency shift to each sub-band at a rate that changes over time.

8. The method of claim 1 comprising imparting a frequency shift to the information-containing optical signal.

9. A system for secure transmission of an information-containing optical signal, comprising:
at least a first optical tapped delay line configured to enable division of the optical signal into a first plurality of spectral sub-bands defined by the equation:

$$F(t, K) = \int_{\omega_K}^{\omega_{K+1}} \int_0^T f(S+t)e^{j\omega S} \, dS \, d\omega$$

where
v. t=aperture of the hyperfine device (tap key),
vi. S=time integration variable,
vii. ω=frequency, and
viii. K=sub-band index,
at least a first phase modulator configured to enable modification of each of the first plurality of spectral sub-bands to encrypt the information contained in the optical signal by at least one of (i) imparting a phase shift to each sub-band, (ii) imparting a time delay to each sub-band, and (iii) imparting a frequency shift to each sub-band, the first optical tapped delay line being configured to enable combining the modified first plurality of spectral sub-bands into a combined optical signal,
at least a second optical tapped delay line configured to enable division of the combined optical signal into a second plurality of spectral sub-bands,
at least a second phase modulator configured to enable modification of each of the second plurality of spectral sub-bands to decrypt the information previously encrypted by at least one of (i) imparting a phase shift to each sub-band, (ii) imparting a time delay to each sub-band, and (iii) imparting a frequency shift to each sub-band, the second optical tapped delay line being configured to enable combining the modified second plurality of spectral sub-bands into a combined optical signal.

10. The system of claim 9 comprising:
at least a third optical tapped delay line configured to enable division of each of the first plurality of spectral sub-bands into a plurality of finer spectral sub-bands, and wherein at least the first phase modulator is configured to enable modification of each of the plurality of finer spectral sub-bands to encrypt the information contained in the optical signal.

11. The system of claim 9 wherein at least one of the first and second phase modulator comprises a reflective phase modulating array.

12. The system of claim 9 wherein at least one of the first and second phase modulator comprises a transmissive phase modulating array.

13. The system of claim 9 comprising at least one computer for controlling at least one of modification of the first plurality of spectral sub-bands by the first phase modulator and modification of the second plurality of spectral sub-bands by the second phase modulator.

14. The system of claim 9 wherein at least one of the first and second phase modulator comprises at least one of a liquid crystal array, a micro-electromechanical systems device, an array of III-V or II-VI semiconductor devices.

15. The system of claim 9 wherein
at least a first pair of optical tapped delay lines configured to enable division of the optical signal into a first plurality of spectral sub-bands,
at least a second pair of optical tapped delay lines configured to enable division of the combined optical signal into a second plurality of spectral sub-bands,
wherein at least one of the first and second phase modulator comprises a transmissive phase modulating array.

* * * * *

UNITED STATES PATENT AND TRADEMARK OFFICE
CERTIFICATE OF CORRECTION

PATENT NO. : 7,720,226 B2  
APPLICATION NO. : 10/715824  
DATED : May 18, 2010  
INVENTOR(S) : Terry M. Turpin It is certified that error appears in the above-identified patent and that said Letters Patent is hereby corrected as shown below:

Title Page (73) Assignee, Delete "Essex Corporation" and insert --Northrop Grumman Systems Corporation--.

Signed and Sealed this

Fourteenth Day of December, 2010

David J. Kappos  
*Director of the United States Patent and Trademark Office*